US012801368B2

(12) United States Patent
Sinha et al.

(10) Patent No.: US 12,801,368 B2
(45) Date of Patent: Nov. 17, 2026

(54) DYNAMIC INTEGRATED CONFIGURATION OF SEGREGATED APPLICATIONS

(71) Applicant: INTERNATIONAL BUSINESS MACHINES CORPORATION, Armonk, NY (US)

(72) Inventors: Sarika Sinha, Bangalore (IN); Siddharth K. Saraya, Raniganj (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 18/177,159

(22) Filed: Mar. 2, 2023

(65) Prior Publication Data

US 2024/0296038 A1 Sep. 5, 2024

(51) Int. Cl.
*G06F 8/65* (2018.01)
*G06F 8/71* (2018.01)
*G06F 9/50* (2006.01)

(52) U.S. Cl.
CPC .................. *G06F 8/65* (2013.01); *G06F 8/71* (2013.01); *G06F 9/5061* (2013.01)

(58) Field of Classification Search
CPC ............. G06F 8/65; G06F 8/71; G06F 9/5061
See application file for complete search history.

(56) References Cited

U.S. PATENT DOCUMENTS 10,379,838 B1 8/2019 Chud
10,725,763 B1 7/2020 Chud
2004/0123285 A1 6/2004 Berg
2007/0143752 A1 6/2007 Clemm
2014/0344224 A1* 11/2014 LeBert ................ G06F 16/9535 707/684
2021/0042216 A1* 2/2021 Magnezi ................. G06F 8/658
2024/0264907 A1* 8/2024 Abdelhalim ........ G06F 11/1417

OTHER PUBLICATIONS

Kramer, et al., "Dynamic Configuration for Distributed Systems," IEEE Transactions on Software Engineering, Apr. 1985, pp. 424-436, vol. SE-11, Issue: 4, IEEE, DOI: 10.1109/TSE.1985.232231, Retrieved from the Internet: <URL: https://ieeexplore.ieee.org/document/1702024>.

(Continued)

*Primary Examiner* — Geoffrey R St Leger
(74) *Attorney, Agent, or Firm* — Harrity & Harrity, LLP

(57) ABSTRACT

A method, system, and computer program product are provided for partitioning a filesystem of a device into a primary partition and a backup partition. Prior to updating an application and/or operating system on the primary partition, a leaf on the backup partition corresponding to the application and/or operating system being updated is created. The execution is monitored of the updated application and/or operating system. In response to a defect being raised against the updated application and/or operating system, leaves corresponding to the updated application and/or operating system are retrieved from the backup partition leaves until the last known good version of the updated application and/or operating system is retrieved. The leaves are sorted by timestamp. The installable image(s) are retrieved from a software repository and applied by timestamp, until reverting to the last known good version in the primary partition is complete.

20 Claims, 3 Drawing Sheets

(56) References Cited

OTHER PUBLICATIONS

Maggiani, "Method for Installing Software Upgrades with Improved Uninstall Capabilities," IP.com, Jan. 22, 2009, 5 pages, IP.com No. IPCOM000178304D, Retrieved from the Internet: <URL: https://priorart.ip.com/IPCOM/000178304>.
No Author, "Method for dynamic version switch of transaction recoverable software," IP.com, Jul. 29, 2008, 15 pages, IP.com No. IPCOM000173261D, Retrieved from the Internet <URL: https://priorart.ip.com/IPCOM/000173261>.
SIMPLILEARN, "The 12 Most Effective and Popular Software Configuration Management Tools Used Today," simplilearn [online], Sep. 7, 2022 [accessed on Jan. 18, 2023], 12 pages, Retrieved from the Internet: <URL: https://www.simplilearn.com/configuration-management-tools-article>.
Zheng, et al., "Personalized product configuration framework in an adaptable open architecture product platform," Journal of Manufacturing Systems, Mar. 2017, 15 pages, vol. 43, DOI:10.1016/j.jmsy.2017.03.010, Retrieved from the Internet: <URL: https://www.researchgate.net/publication/316685508_Personalized_product_configuration_framework_in_an_adaptable_open_architecture_product_platform>.

* cited by examiner

DYNAMIC INTEGRATED CONFIGURATION OF SEGREGATED APPLICATIONS

BACKGROUND

The present invention relates to computer systems, and more specifically to dynamic integrated configuration of segregated applications.

One aspect of configuration management is the secure and scalable deployment of applications, software updates and operating systems, thereby maintaining computer systems, servers, and software in a consistent state. Typically, each application and operating system is identified by a version based on additions and improvements provided in the latest version. Configuration management tracks the content of the previous versions so that changes can be rolled back to any version if needed. This is particularly useful if errors are discovered in a new version after it is installed.

Current configuration systems are limited to the application version or operating system version that is registered in the system and are not able to track the applications and operating system versions that comprise an operating environment.

It would be advantageous to define an operating system along with the hosted applications as a version set, with any changes to the version set being treated as a next version set, thereby retaining the last known operating environment as being available for roll back.

SUMMARY

A method is provided for partitioning a filesystem of a device into a primary partition and a backup partition. Prior to updating an application and/or operating system on the primary partition, a leaf on the backup partition corresponding to the application and/or operating system being updated is created. The execution is monitored of the updated application and/or operating system. In response to a defect being raised against the updated application and/or operating system, leaves corresponding to the updated application and/or operating system are retrieved from the backup partition leaves until the last known good version of the updated application and/or operating system is retrieved. The leaves are sorted by timestamp. The installable image(s) are retrieved from a software repository and applied by timestamp, until reverting to the last known good version in the primary partition is complete.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

One aspect of managing computer configurations is the secure and scalable deployment of applications, software updates and operating systems, thereby maintaining computer systems, servers, and software in a consistent state. Typically, each individual application and operating system is identified by a unique version based on additions provided in the latest version. The additions can include new functionality or fixes to defects. Configuration management tracks the content of the previous versions so that changes can be rolled back to a previous version if needed. This is particularly useful if errors are discovered in a new version after it is installed.

Current configuration systems are limited to managing the application version or operating system version that is registered in the system and are not able to track the applications and operating system versions that comprise an operating environment. In other words, each individual application or operating system is registered with the configuration system, and its version is tracked individually. In this scenario, to roll back an application version may require multiple individual actions to roll back of one or more other dependencies to maintain consistency, either in another application or in the operating system. The time and expertise of a system administrator may be required to correctly analyze the dependencies and select the correct versions for roll back.

It would be advantageous to define an operating system along with the hosted applications together as an operating environment's version set, with any changes to the version set being treated as a next version set, thereby retaining the last known operating environment as being available for roll back.

Figure 2:
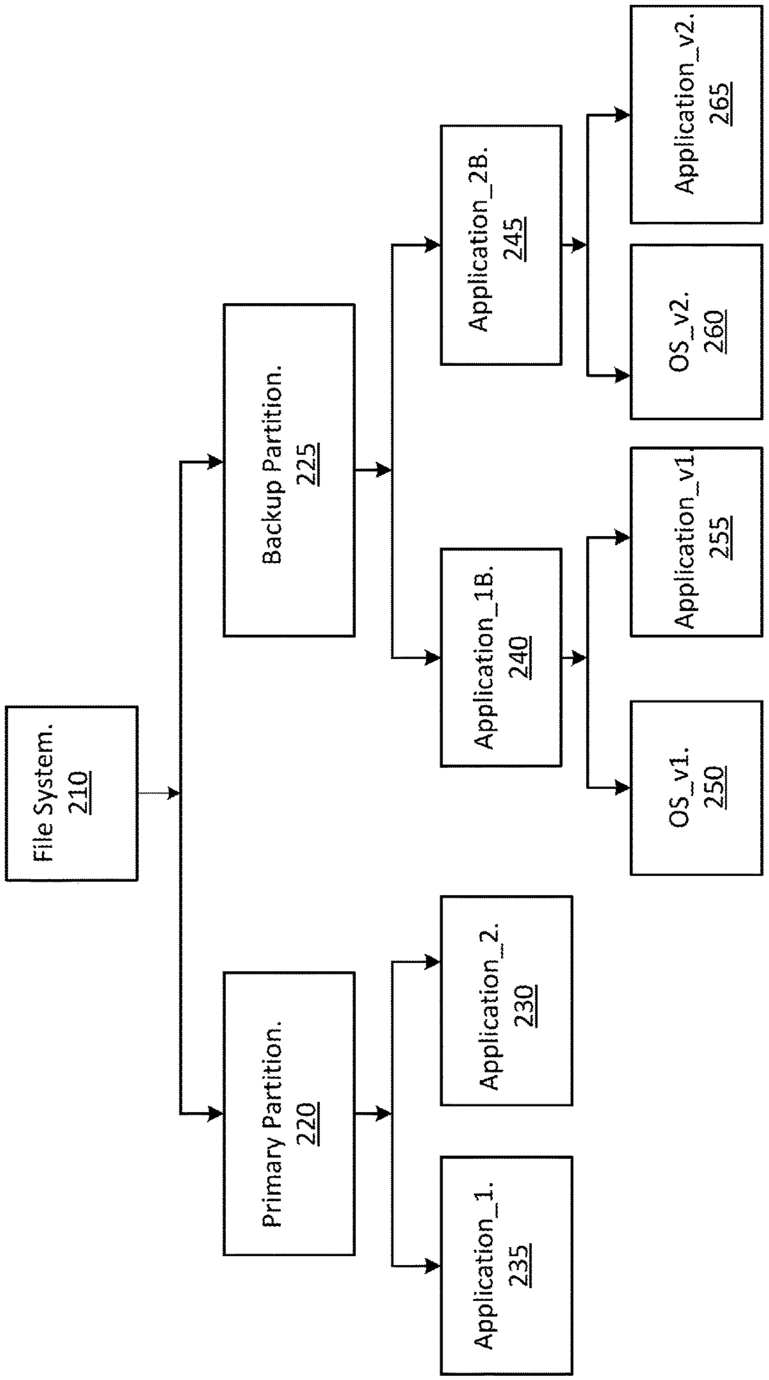
FIG. 2 illustrates an exemplary partitioned file system, in accordance with one or more aspects of the present invention.

As shown in FIG. 2, the present invention embodies a dynamic integrated configuration system (system) 300 to address shortcomings in current practice by implementing a backup partition 225 on a file system 210 on the user's computer. In this context, "computer" includes cloud hosted servers, smart phones, tablets, and laptops. The backup partition 225 is accessible by the system 300 but not by the user of the device.

The backup partition 225 includes branches for each installed application. In this example, the primary partition 220 on the file system 210 has installed an application_1 235 and an application_2 230. The backup partition 225 includes a corresponding node for each of the two applications, here application_1b 240, and application_2b 245. Application_1b 240 and application_2b 245 can be considered the base version of the respective applications application_1 235 and application_2 230. The leaves OS_v1 250 and OS_v2 260 represent the OS versions on which the base applications are installed. The leaves application_v1 255, and application_v2 265 represent the base applications with incremental updates. The entries in the backup partition 225 may identify a version, a count, a status, and a timestamp of the entry's creation, the combination of which uniquely identifies the entry. The entries in the backup partition 225 are not the installed images of the applications and OS as installed on the primary partition 220. Instead, each of the entries includes a pointer to where the actual image is located. For example, the actual image may be stored and managed in a central software repository that is remote from each user device but may be accessed by the system 300 if needed to revert an installed application or OS to a known good version. Keeping only this minimum amount of information on the user device makes more of the device storage available for the user. Additionally, the installable images are more securely managed when stored separately from the user device. For example, a central software repository may have enhanced cyber security protection. Also, the installable images in the central repository are readily available if the user device is damaged or lost.

For example, consider a new version of application_1 235 is to be installed on the primary partition 220. Prior to installing the new version, the system 300 creates a new leaf on the backup partition 225, such as application_v1 255, which is the last known good version. Upon installation, the status of the new version on the primary partition 220 is pending. When the user satisfactorily executes the new version a configurable number of times, the invention updates the status of the new version to indicate that it is now the current known good version.

The system 300 may have an interface to an enterprise's defect management system. In response to receiving a problem report for an application or OS, the system 300 retrieves from the backup partition 225 the timestamp and version information of the last known good version. It may be that the last known good version is one or more nodes prior to the leaf node. In that case, the timestamp and version information for all the intervening versions up to the last known good version are retrieved and sorted by timestamp. The system 300 reverts versions back to the last known good version. Following the reverting to the last known good version, the user is prompted for confirmation that the problem report can be closed satisfactorily. It may be possible that the user's device cannot be properly reverted. For example, a hardware issue may require a more complex solution, including installing a docker image after the underlying problem is resolved.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
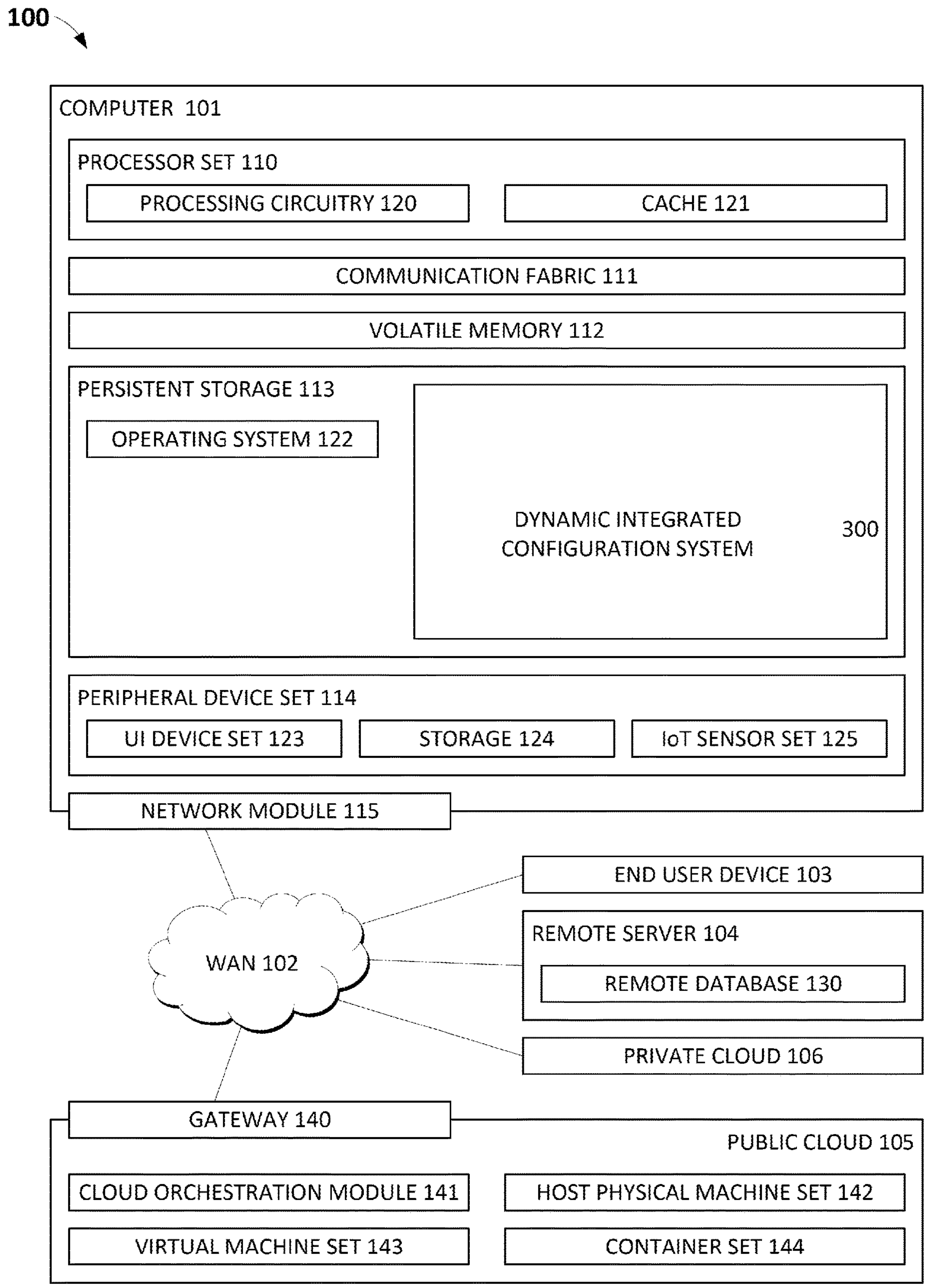
FIG. 1 illustrates the operating environment of a computer server for a dynamic integrated configuration system, according to an embodiment of the present invention.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as the dynamic integrated configuration system (system) 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 3:
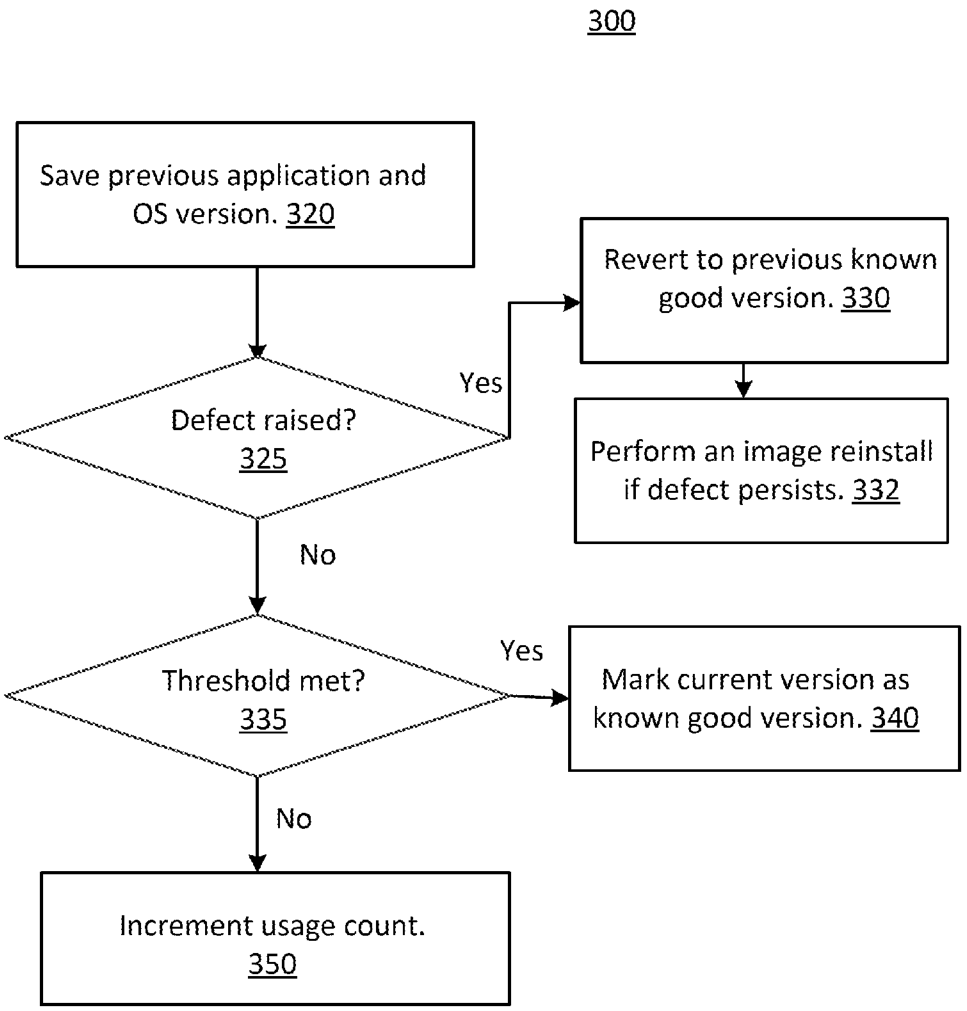
FIG. 3 illustrates a flowchart of an exemplary implementation of a dynamic integrated configuration system, in accordance with one or more aspects of the present invention.

FIG. 3 illustrates an exemplary implementation of the dynamic integrated configuration system 300.

Prior to updating the application and/or OS, at 320, the system 300 saves the current working version(s) from the primary partition 220 by creating a corresponding leaf in the backup partition 225. The corresponding leaf is uniquely identified by at least a version, timestamp, and a pointer to the actual installable image. The status of the leaf is considered pending until the newly installed update to the application and/or OS in the primary partition 220 is executed without error a configurable number of times. At 325, if a defect is raised due to the updated application and/or OS, the system 300 reverts to the previous know good version (330). This is identified by a status in leaf in the backup partition 225 corresponding to version having the defect. It may be that the last known good version is one or more nodes prior to the leaf node. In that case, the timestamp and version information for all the intervening versions up to the last known good version are retrieved and sorted by timestamp. The system 300 reverts starting with the most current timestamp and continues back in time until the reverting is complete at the last known good version. If the defect persists, it may be necessary to completely reinstall the affected software using an install image (332). If the updated software does not raise a defect (325) and is successfully executed a configurable number of times (335), the updated application and/or OS can be considered reliable and becomes the last known good version (340). If, at 350, the configured number of times is not yet reached, the usage count is incremented.

What is claimed is:

1. A method, comprising:

partitioning a file system of a device into a primary partition and a backup partition;

prior to updating an application and/or operating system on the primary partition, creating a leaf on the backup partition corresponding to the application and/or operating system being updated;

after updating the application and/or operating system on the primary partition, monitoring execution of the updated application and/or operating system;

in response to a defect being raised against the updated application and/or operating system, retrieving, from the backup partition, leaves corresponding to the updated application and/or operating system until a last known good version of the updated application and/or operating system;

sorting the leaves by timestamp; and retrieving and applying one or more installable images by timestamp, until reverting to the last known good version in the primary partition is complete.

2. The method of claim 1, wherein the backup partition is not accessible by a user of the device.

3. The method of claim 1, wherein the primary partition includes user applications and an operating system that are accessible by a user.

4. The method of claim 1, wherein the leaf includes a timestamp, version, status, and pointer to an installable image of the application and/or operating system.

5. The method of claim 1, wherein the leaf does not include an installable image.

6. The method of claim 1, wherein the backup partition includes a branch for each application and each operating system installed in the primary partition.

7. The method of claim 1, wherein the updated application and/or operating system becomes the last known good version after being successfully executed a configurable number of times.

8. A computer program product, the computer program product comprising a non-transitory tangible storage device having program code embodied therewith, the program code executable by a processor of a computer to perform a method, the method comprising:

partitioning a file system of a device into a primary partition and a backup partition;

prior to updating an application and/or operating system on the primary partition, creating a leaf on the backup partition corresponding to the application and/or operating system being updated;

after updating the application and/or operating system on the primary partition, monitoring execution of the updated application and/or operating system;

in response to a defect being raised against the updated application and/or operating system, retrieving, from the backup partition, leaves corresponding to the updated application and/or operating system until a last known good version of the updated application and/or operating system;

sorting the leaves by timestamp; and retrieving and applying one or more installable images by timestamp, until reverting to the last known good version in the primary partition is complete.

9. The computer program product of claim 8, wherein the backup partition is not accessible by a user of the device.

10. The computer program product of claim 8, wherein the primary partition includes user applications and an operating system that are accessible by a user.

11. The computer program product of claim 8, wherein the leaf includes a timestamp, version, status, and pointer to an installable image of the application and/or operating system.

12. The computer program product of claim 8, wherein the leaf does not include an installable image.

13. The computer program product of claim 8, wherein the backup partition includes a branch for each application and each operating system installed in the primary partition.

14. The computer program product of claim 8, wherein the updated application and/or operating system becomes the last known good version after being successfully executed a configurable number of times.

15. A computer system, comprising:

one or more processors;

a memory coupled to at least one of the processors;

a set of computer program instructions stored in the memory and executed by at least one of the processors in order to perform actions of:

partitioning a file system of a device into a primary partition and a backup partition;

prior to updating an application and/or operating system on the primary partition, creating a leaf on the backup partition corresponding to the application and/or operating system being updated;

after updating the application and/or operating system on the primary partition, monitoring execution of the updated application and/or operating system;

in response to a defect being raised against the updated application and/or operating system, retrieving, from the backup partition, leaves corresponding to the updated application and/or operating system until a last known good version of the updated application and/or operating system;

sorting the leaves by timestamp; and retrieving and applying one or more installable images by timestamp, until reverting to the last known good version in the primary partition is complete.

16. The computer system of claim 15, wherein the backup partition is not accessible by a user of the device.

17. The computer system of claim 15, wherein the primary partition includes user applications and an operating system that are accessible by a user.

18. The computer system of claim 15, wherein the leaf includes a timestamp, version, status, and pointer to an installable image of the application and/or operating system.

19. The computer system of claim 15, wherein the leaf does not include an installable image.

20. The computer system of claim 15, wherein the backup partition includes a branch for each application and each operating system installed in the primary partition.

* * * * *